United States Patent
Chanal et al.

(10) Patent No.: US 7,855,832 B2
(45) Date of Patent: Dec. 21, 2010

(54) OPTICAL INSTRUMENT COMPRISING AN ENTRANCE CAVITY IN WHICH A MIRROR IS PLACED

(75) Inventors: Olivier Chanal, Tanneron (FR); David Valentini, Lecannet (FR); Christophe DeVilliers, Grasse (FR)

(73) Assignee: Thales (FR)

( * ) Notice: Subject to any disclaimer, the term of this patent is extended or adjusted under 35 U.S.C. 154(b) by 172 days.

(21) Appl. No.: 12/095,064

(22) PCT Filed: Nov. 27, 2006

(86) PCT No.: PCT/FR2006/051234
§ 371 (c)(1),
(2), (4) Date: Oct. 27, 2008

(87) PCT Pub. No.: WO2007/060376
PCT Pub. Date: May 31, 2007

(65) Prior Publication Data
US 2010/0033855 A1 Feb. 11, 2010

(30) Foreign Application Priority Data
Nov. 28, 2005 (FR) .................................. 05 53620

(51) Int. Cl.
*G02B 23/16* (2006.01)
(52) U.S. Cl. ............... 359/399; 359/512; 244/171.8
(58) Field of Classification Search ............ 244/171.7, 244/171.8; 359/399, 512
See application file for complete search history.

(56) References Cited

U.S. PATENT DOCUMENTS

| | | | | |
|---|---|---|---|---|
| 3,791,713 A | * | 2/1974 | Mackay | ............ 359/430 |
| 4,098,476 A | * | 7/1978 | Jutte et al. | ............ 248/694 |
| 5,191,469 A | * | 3/1993 | Margolis | ............ 359/366 |
| 6,066,850 A | | 5/2000 | Hersom et al. | |
| 6,101,015 A | | 8/2000 | Budil et al. | |
| 7,180,067 B2 | * | 2/2007 | Wolske | ............ 250/353 |
| 7,374,294 B2 | * | 5/2008 | Willey | ............ 359/507 |
| 2003/0112512 A1 | | 6/2003 | Nagae | |
| 2007/0063105 A1 | * | 3/2007 | Mann | ............ 244/171.8 |

FOREIGN PATENT DOCUMENTS

| | | | |
|---|---|---|---|
| DE | 3714745 A1 | * | 2/1988 |
| EP | 0676838 | | 10/1995 |
| JP | 01246519 A | * | 10/1989 |
| JP | 09133872 A | * | 5/1997 |

OTHER PUBLICATIONS

W. E. Bicknell, C. J. Digenis, S. E. Forman, and D. E. Lencioni, "EO-1 Advanced Land Imager," SPIE Conference on Earth Observing Systems IV, Denver, Colorado, Jul. 18, 1999.*
Wessels, et al., "Inspector Thermal Control," Proceedings of the Sixth European Symposium on Space Enviromental Control Systems, Noordwijk, The Netherlands, May 20-22, 1997.*

* cited by examiner

*Primary Examiner*—Mark Consilvio
(74) *Attorney, Agent, or Firm*—Lowe Hauptman Ham & Berner, LLP

(57) ABSTRACT

The invention relates to an optical instrument (1) comprising at least one mirror called the primary mirror (3), placed in a cavity (2) and comprising an active face capable of being subjected to instantaneous variations of the incident radiative flux. According to the invention, the cavity (2) comprises a rigid internal casing (20) around the mirror consisting of a material having a thermal inertia so as to damp the instantaneous variations of the incident radiative flux thereby making it possible to limit the temperature fluctuations of this cavity and, consequently, the temperature fluctuations of the mirror. The invention applies to the space field.

13 Claims, 1 Drawing Sheet

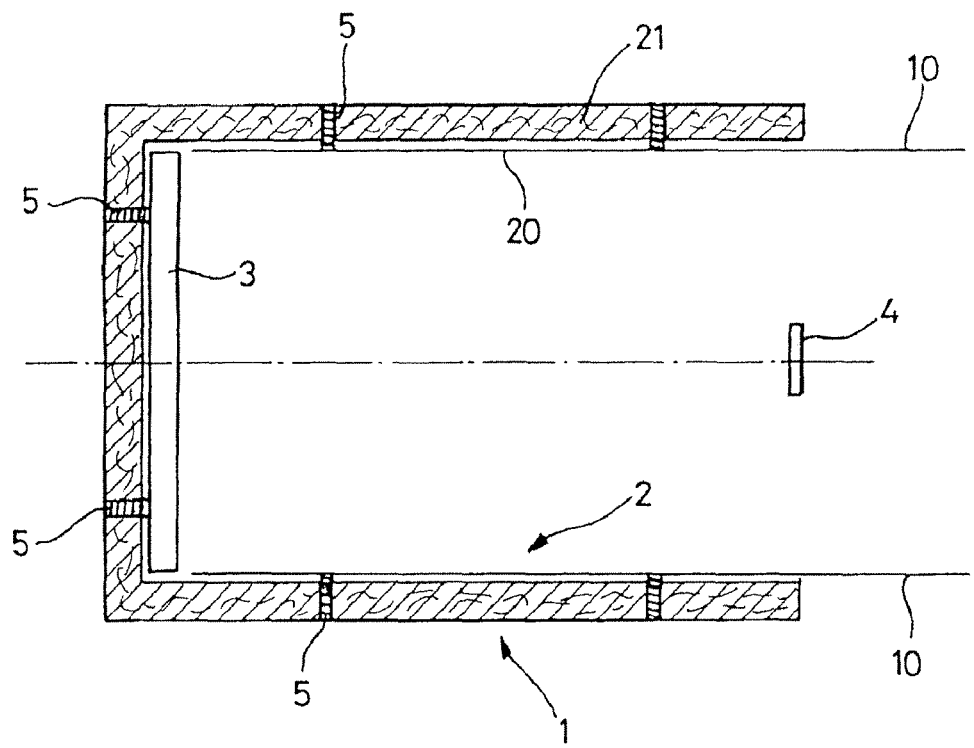
FIG_1
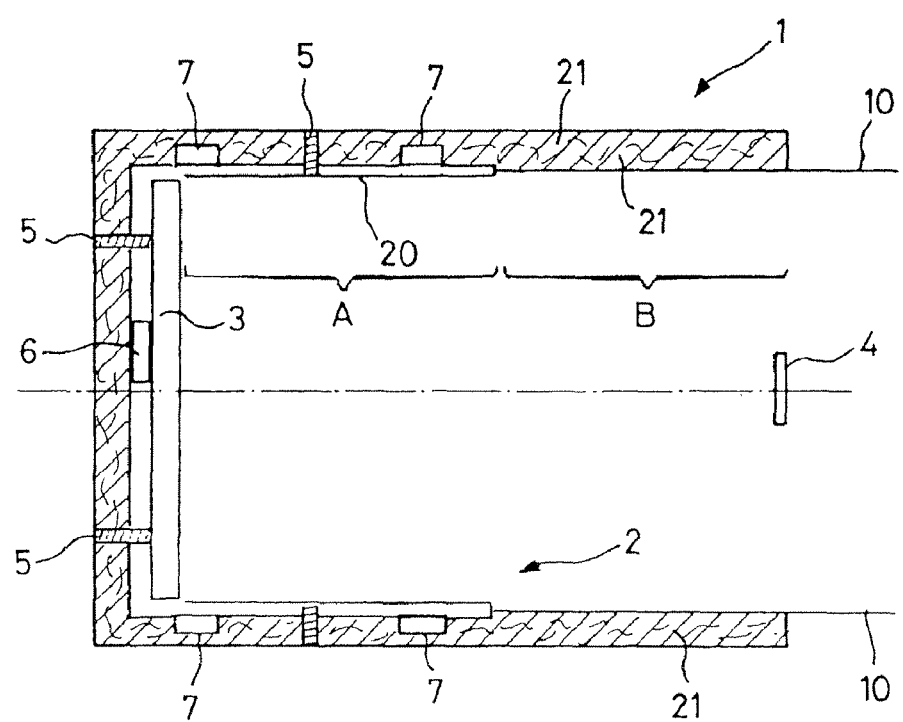
FIG_2

OPTICAL INSTRUMENT COMPRISING AN ENTRANCE CAVITY IN WHICH A MIRROR IS PLACED

CROSS-REFERENCE TO RELATED APPLICATIONS

The present application is based on International Application No. PCT/FR2006/051234, filed on Nov. 27, 2006, which in turn corresponds to French Application No. 0553620, filed on Nov. 28, 2005, and priority is hereby claimed under 35 USC §119 based on these applications. Each of these applications are hereby incorporated by reference in their entirety into the present application.

FIELD OF THE INVENTION

The invention relates to an optical instrument comprising an entrance cavity in which a mirror called the primary mirror is placed.

BACKGROUND OF THE INVENTION

The invention applies to any optical instrument comprising a mirror requiring a very great thermal stability, in order to limit the thermoelastic deformations, in particular over short periods, for example one to two hours.

The invention applies most particularly but not exclusively to the optical instruments used in the space field such as the optical instruments on board satellites (typically telescopes).

Specifically, certain optical instruments such as telescopes require a very great geometric stability of their primary mirror at ambient temperature, both over the long term and short term.

With the use of new ceramic materials (silicon carbide-based: CeSiC, SiC, etc.) for producing mirrors, this constraint results, amongst other things, in a high thermal stability in terms of variation of gradient in the thickness of the mirror and in terms of temperature fluctuation of the active face. These mirrors, called primary mirrors, situated in an entrance cavity of the instrument, are subjected directly or indirectly to the external flux variations (solar, terrestrial or albido) on the orbit, and all the year round.

Hitherto, the thermal regulation of such mirrors has been provided by an active regulation of the rear face radiative type. "Active" regulation is carried out conventionally by heaters driven by thermostats or by onboard software coupled to thermistors. This type of regulation makes it possible to maintain the temperature of the mirror at a defined level and to compensate for the variations of flux absorbed by the front face during the year. On the other hand, this type of regulation does not make it possible to compensate for the orbital fluctuations in the context of a satellite in low Earth orbit, because of the purely radiative mode of exchange between the heaters and the mirror.

Other solutions, of the active optical type, exist but are costly and complex to apply because of the use of dedicated electronics and complex functional tests on the ground, and they have a risk of failure.

A direct thermal regulation of the active face would make it possible to obtain an equivalent level of stability of the mirror, but this solution is, to the knowledge of the applicant, not achieved and would present risks of thermoelastic deformation.

SUMMARY OF THE INVENTION

The object of the present invention is to solve this problem.

Specifically, the invention proposes a solution to the problem of very great thermal stability demanded at the primary mirror of an optical instrument. Its object is to provide a solution notably with respect to fluctuations of short periods in the case of satellite optical instruments from low Earth orbit to geostationary.

The proposed solution consists in producing an entrance cavity of the instrument comprising a rigid casing creating a thermal inertia of all or a portion of the cavity.

The thermal inertia of this casing, situated in the immediate vicinity of the primary mirror where the radiative exchanges are the greatest, makes it possible to limit the temperature fluctuations of the cavity and, consequently, the temperature fluctuations of the mirror.

More particularly, the subject of the present invention is an optical instrument comprising at least one mirror called a primary mirror (3) placed in a cavity (2), the primary mirror comprising an active face capable of being subjected to instantaneous variations of the incident radiative flux, characterized in that the cavity comprises a rigid internal casing (20) around the mirror forming at least a portion of the cavity, this casing consisting of a material having a thermal inertia so as to dampen the instantaneous variations of the incident radiative flux thereby making it possible to limit the temperature fluctuations of this cavity and, consequently, the temperature fluctuations of the mirror.

To limit the weight of the instrument, the rigid internal casing extends over a first portion of the cavity defined as being close to the mirror, this portion going from the mirror to a distance d less than the total length l of the entrance cavity of the instrument.

Advantageously, the first casing is made of aluminum or any other materials having a high thermal inertia (e.g. beryllium).

Advantageously, the aluminum casing has a thickness of approximately 1 mm.

According to another feature, the cavity also comprises a second casing consisting of a thermal insulating material placed over the whole perimeter of the cavity and at the bottom of the latter, that is to say behind the mirror.

If the second casing forms a first cavity portion, the second casing covers the first and extends this first cavity portion to form a second portion in continuity with the first (FIG. 2).

Advantageously, the second casing consists of a Multi-Layered Insulation (MLI) structure.

According to another feature, the instrument also comprises active means for controlling the temperature of the mirror.

The invention applies to telescopes on board satellites irrespective of the size of their primary mirror.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

FIG. 1 represents a longitudinal section of the optical instrument according to one embodiment, FIG. 2 represents a longitudinal section of the optical instrument according to a second embodiment.

DETAILED DESCRIPTION OF THE INVENTION

The instrument 1 described comprises a cavity 2 making it possible to receive the mirror 3, called the primary mirror, and to attach it to the instrument by conventional attachment means 5. Usually, the mirror is in a tubular cavity with a diameter slightly greater than its own so as to come on the periphery of this mirror. The mirror 3 is centered in the cavity and its active face is turned toward the entrance of the cavity, the place for the location of a secondary mirror 4.

In the prior art, the cavity is made by a thermal insulation casing made by an insulation cover called MLI (Multi-Layered Insulation) painted black on the inside of the cavity and having great temperature variations.

Rather than using a conventional insulation casing, the proposed solution consists in using an entrance cavity for the optical instrument 1 having a great thermal inertia. For this, the cavity 2 comprises at least one portion made of a material with high inertia with respect to the rapid temperature fluctuations. Therefore, the entrance cavity of the instrument produced according to the invention is less sensitive to the external fluctuations, notably with respect to rapid fluctuations of the orbital type.

For this purpose, the entrance cavity 2 of the optical instrument 1 comprises a rigid internal casing 20 around the mirror 3 consisting of a material having a thermal inertia damping the instantaneous variations of the incident radiative flux. The thermal inertia casing limits the temperature fluctuations of the cavity and, consequently, the temperature fluctuations of the mirror.

The thermal inertia rigid casing 20 is of tubular shape and forms all or a portion of the entrance cavity of the optical instrument 1. Two exemplary embodiments corresponding to these two alternatives are illustrated by the diagrams of FIGS. 1 and 2.

In the diagram of FIG. 1, the casing 20 forms all the cavity 2. In this case, the length of the casing 20 corresponds to that of the entrance cavity 2. The casing, in this case, goes from the primary mirror 3 to the entrance of the cavity which corresponds to the location of the secondary mirror 4.

However, in certain applications, for reasons of limiting the weight of the optical instrument, the casing 20 will preferably have a length that is less than that of the entrance cavity while remaining sufficiently long to perform its function of damping instantaneous variations of the incident radiative flux. This exemplary embodiment is illustrated by the diagram of FIG. 2, the casing 20 forming only a portion of the cavity 2.

The diameter of the casing 20 is slightly greater than that of the primary mirror 3 so that the latter can be placed on the periphery of the mirror 3.

In all cases, the cavity portion having a thermal inertia or the whole of the cavity having this thermal inertia relative to the thermal fluctuations is covered with a thermal insulation casing 21 of the multi-layered type "MLI".

If only a portion of the cavity comprises a thermal inertia rigid casing as shown in FIG. 2, the insulation casing 21 covering this cavity portion extends over the whole length of the entrance cavity, its inner surface being in the extension of the inner surface of the thermal inertia casing 20.

A material such as aluminum having a high calorific capacity and a good thermal conductibility may advantageously be used to produce the thermal inertia casing.

The inner face of the cavity portion A made of aluminum 20 is painted black for optical reasons, and the outer face is insulated from the instrument 1 with the MLI-type multi-layered insulation casing 21 in order to maintain a temperature level sufficiently low that makes it possible to regulate the mirror at approximately 20° C.

Depending on the requirement, the proposed solution may be further enhanced with means 6 and 7 illustrated in FIG. 2, conventionally used to control temperature, namely:

1) an active control 7 of the temperature of the rigid casing with the aid of a regulation of the Proportional-Integral-Derivative type, for example, which makes it possible to further reduce the thermal fluctuations of the casing and hence of the mirror.

2) the association of an active regulation of the mirror on the rear face of the radiative type 6 which becomes, with the presence of the high thermal inertia cavity, markedly more effective for compensating for the short-duration fluctuations, of the orbital type. This is due to the fact that the instantaneous variations of the radiative flux originating from the close cavity are damped, because of the inertia of the cavity, relative to the variations originating from a cavity comprising only an insulation of the MLI type.

3) the association of an active regulation of the mirror on the rear face of the radiative type, whose control loop is driven by the temperature of the cavity, thereby making it possible to anticipate and compensate for the temperature fluctuations of the mirror.

As an example, a thermal model of an assembly comprising:

one primary mirror 3 with a diameter of 1.3 m the cavity 2 being furnished with a rigid aluminum casing 20 of approximately 1 mm over the half A of the length, that is a length of 1.2 m, the cavity 2 being covered with an insulation casing 21 of the MLI type covering the aluminum casing and extending the casing 21 to form the other half B of the cavity, whereby the internal casing 20 forms a first portion of a sidewall of the cavity, and the insulation casing 21 forms a second portion of the sidewall of the cavity, one secondary mirror 4 one entrance baffle 10, has made it possible, for a satellite in low Earth orbit, to quantify the gains obtained according to the invention:

| Structure of the cavity of the optical instrument | Orbital variation of the mean temperature of the primary mirror (active face) (mK) | Orbital variation of the thermal gradient in the thickness of the primary mirror (mK) |
|---|---|---|
| Conventional (cavity covered with MLI) | 310 | 12.4 |
| Half of the cavity with rigid aluminum internal casing, not regulated | 110 | 4.8 |
| Half of the cavity with aluminum internal casing, regulated | 90 | 3.6 |

| Structure of the cavity of the optical instrument | Orbital variation of the mean temperature of the primary mirror (active face) (mK) | Orbital variation of the thermal gradient in the thickness of the primary mirror (mK) |
|---|---|---|
| Active regulation of the mirror (radiative type) and half of the cavity with aluminum internal casing (not regulated) | 16 | 1.7 |

Therefore, the modification of the structure of the entrance cavity of the optical instrument as proposed makes it possible to attenuate the incidence flux variations seen by the active face of the mirror, and notably the fluxes originating from the near cavity.

A cavity comprising an aluminum tubular casing 1.2 m long and 1 mm thick in the environment close to the primary mirror with a 1.3 m diameter is sufficient to obtain these results.

An optimization of the length of the rigid casing is necessary depending on the stability requirements demanded and the increased weight generated.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. An optical instrument comprising:
    a primary mirror placed in a cavity, the primary mirror having an active face capable of being subjected to instantaneous variations of an incident radiative flux;
    first casing positioned around the primary mirror forming a first portion of a sidewall of the cavity, said first casing formed of a material having a thermal inertia so as to dampen the instantaneous variations of the incident radiative flux thereby making it possible to limit the temperature fluctuations of said cavity and, consequently, the temperature fluctuations of the mirror; and
    a second casing positioned to cover the first casing and extending to form a second portion of the sidewall of the cavity, the second casing being formed of a thermal insulating material.

2. The optical instrument as claimed in claim 1, wherein the first portion of the cavity is closer to the primary mirror than the second portion, and the first portion extends from the primary mirror toward an entrance of the cavity for a distance d less than a total length l of the cavity.

3. The optical instrument as claimed in claim 2, wherein the first casing is made of aluminum.

4. The optical instrument as claimed in claim 2, wherein the second casing is positioned over the whole perimeter of the cavity at the bottom of the cavity on the opposite side of the active face of the primary mirror.

5. The optical instrument as claimed in claim 2, further comprising active means and for controlling the temperature of the mirror and of the first casing.

6. The optical instrument as claimed in claim 1, wherein the first casing comprises a material having a high thermal inertia.

7. The optical instrument as claimed in claim 6, wherein the first casing has a thickness of approximately 1 mm.

8. The optical instrument as claimed in claim 6, wherein the first casing is made of aluminum.

9. The optical instrument as claimed in claim 1, wherein the second casing is positioned over the whole perimeter of the cavity at the bottom of the cavity on the opposite side of the active face of the primary mirror.

10. The optical instrument as claimed in claim 9, wherein the second casing is formed of an multi-layered insulation (MLI) structure.

11. The optical instrument as claimed in claim 9, wherein the second casing forms the sidewall of the cavity in continuity with the first casing.

12. The optical instrument as claimed in claim 1, wherein the second casing forms the sidewall of the cavity in continuity with the first casing.

13. The optical instrument as claimed in claim 1, further comprising active means for controlling the temperature of the mirror and of the first casing.

* * * * *